United States Patent
Watanabe et al.

(10) Patent No.: US 8,790,848 B2
(45) Date of Patent: Jul. 29, 2014

(54) PROCESS FOR PRODUCING SEPARATOR AND SEPARATOR

(75) Inventors: Yusuke Watanabe, Toyota (JP); Kazutaka Iizuka, Nissin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1088 days.

(21) Appl. No.: 12/282,229

(22) PCT Filed: Feb. 22, 2007

(86) PCT No.: PCT/JP2007/053849
§ 371 (c)(1), (2), (4) Date: Sep. 9, 2008

(87) PCT Pub. No.: WO2007/105490
PCT Pub. Date: Sep. 20, 2007

(65) Prior Publication Data
US 2009/0042085 A1    Feb. 12, 2009

(30) Foreign Application Priority Data
Mar. 9, 2006 (JP) ................................. 2006-064744

(51) Int. Cl.
  H01M 8/00 (2006.01)
  H01M 4/64 (2006.01)
  B05D 5/12 (2006.01)

(52) U.S. Cl.
USPC ............................ 429/535; 429/518; 427/115

(58) Field of Classification Search
CPC ............ H01M 8/0223; H01M 8/0228; H01M 8/0241; H01M 8/0245
USPC ........................................... 429/518; 427/115
See application file for complete search history.

(56) References Cited

U.S. PATENT DOCUMENTS

| | | | |
|---|---|---|---|
| 5,230,849 A * | 7/1993 | Hsu | 264/104 |
| 6,793,544 B2 | 9/2004 | Brady et al. | |
| 6,887,613 B2 * | 5/2005 | Lee et al. | 429/522 |
| 2007/0031721 A1 * | 2/2007 | Winter et al. | 429/38 |

FOREIGN PATENT DOCUMENTS

| | | |
|---|---|---|
| EP | 1 006 600 A2 | 6/2000 |
| EP | 1160900 A2 | 12/2001 |
| JP | 2000-156234 A | 6/2000 |
| JP | 2000-243408 A | 9/2000 |
| JP | 2001-196080 A | 7/2001 |

(Continued)

OTHER PUBLICATIONS

Office Action of DE 11-2007-000-572.6-45 dated Jul. 21, 2010 and received Aug. 12, 2010, and English translation thereof.

(Continued)

Primary Examiner — Barbara Gilliam
Assistant Examiner — Robert S Carrico
(74) Attorney, Agent, or Firm — Kenyon & Kenyon LLP

(57) ABSTRACT

In fuel cell separator, the periphery of manifold through which fuel gas, reaction water, etc., pass and the seal line being a site of bonding with an adjacent separator are provided with a resin layer. Within the surface of the separator, the resin application site on which the resin layer is formed undergoes subbing treatment in advance to thereby increase the capability of bonding with the resin. When the resin layer consists of a resin having an NH group, as the subbing treatment, hydroxide deposition treatment is carried out on the surface of the separator.

10 Claims, 4 Drawing Sheets

(56) References Cited

FOREIGN PATENT DOCUMENTS

| | | |
|---|---|---|
| JP | 2002-025574 A | 1/2002 |
| JP | 2003-077500 A | 3/2003 |
| JP | 2003-092112 A | 3/2003 |
| JP | 2003-249240 A | 9/2003 |
| JP | 2003-272655 A | 9/2003 |
| JP | 2005-149749 A | 6/2005 |
| JP | 2005-158441 A | 6/2005 |
| JP | 2005-243354 A | 9/2005 |
| JP | 2006-509333 A | 3/2006 |
| WO | 2004/051764 A2 | 6/2004 |

OTHER PUBLICATIONS

German office action dated Dec. 19, 2013 for application No. 11 2007 000 572.6.

* cited by examiner

PROCESS FOR PRODUCING SEPARATOR AND SEPARATOR

This is a 371 national phase application of PCT/JP2007/053849 filed 22 Feb. 2007, claiming priority to Japanese Patent Application No. 2006-064744 filed 9 Mar. 2006, the contents of which are incorporated herein by reference.

FIELD OF THE INVENTION

The present invention relates to a separator that forms a partition wall between unit cells of a fuel cell, and a process for producing the separator.

BACKGROUND OF THE INVENTION

Fuel cells are now being used in vehicles and in other fields. In a solid polymer fuel cell (hereafter simply referred to as a "fuel cell"), an assembly (MEA: Membrane Electrode Assembly) comprising an electrolyte film formed from a solid polymer film sandwiched between two electrodes, namely a fuel electrode and an air electrode, is itself sandwiched between two separators to generate a cell that functions as the smallest unit, and a plurality of these cells are then stacked to form a fuel cell stack (FC stack), enabling a high voltage to be obtained.

Here, the fuel cell separators are formed from a metal material such as SUS. A multitude of techniques have been proposed for improving the corrosion resistance of the separators formed from this metal. For example, JP 2002-25574 A and JP 2005-158441 A disclose a technique in which the peripheral edges of the separator manifold are covered with a resin or film having excellent corrosion resistance. The manifold describes an aperture formed in the separator, and the fuel gas, air and moisture and the like pass through this manifold.

However, the surface of the separator is normally coated with a chemically inert passivation film, and the bonding strength to resins or the like is weak. As a result, the stress generated during cell stacking, and the stress generated due to the expansion that occurs under the action of the heat generated during operation of the fuel cell may cause the resin layer or the like to peel. Furthermore, because the surface of the separator has inherently poor wetting properties, if the resin coating material is water-soluble, then applying the resin coating material uniformly to the separator surface is impossible, and a favorable resin layer can not be formed.

JP 2000-243408 A discloses that when those regions of the fuel gas passages formed within the center of the separator that do not contact the electrode are coated with a resin, the bonding properties with the separator can be improved by including OH groups within the resin. Furthermore, JP 2003-272655 A discloses a technique in which a passivation treatment is conducted by immersing the separator in an acidic bath in order to improve the performance of the fuel gas passages. However, both of these techniques aim to improve the quality and function of the fuel gas passages, and applying these techniques to improvement of the quality and function of those regions of the separator besides the gas passages is problematic.

In other words, with the conventional technology, effectively improving the corrosion resistance and the like of those regions of the separator besides the gas passages is problematic, and as a result, improving the quality of the fuel cell itself is difficult.

Accordingly, it is an advantage of the present invention to provide a separator that is capable of improving the quality of a fuel cell, and a process for producing the separator.

SUMMARY OF INVENTION

A process for producing a separator according to the present invention is a process for producing a separator that forms a partition wall between unit cells of a fuel cell, wherein on the separator substrate, a subbing treatment is performed within at least a resin application region in which a resin layer is to be provided, to thereby allow a hydroxide or oxide having a high affinity for atoms constituting the resin to be deposited, prior to provision of the resin layer.

In a preferred aspect, the resin application region is in the vicinity of an opening through which a fluid can pass. In another preferred aspect, the resin application region is a seal line that represents a region of bonding with an adjacent separator.

In those cases where the resin layer is composed of an NH-containing resin, the subbing treatment is preferably a treatment in which a hydroxide is deposited on the surface of the separator substrate. In this case, the subbing treatment is preferably a treatment in which OH groups are covalently bonded to metal atoms on the surface of the separator substrate. In those cases where the resin layer is composed of an OH-containing resin, the subbing treatment is preferably a treatment in which oxygen atoms are covalently bonded to metal atoms on the surface of the separator substrate.

The subbing treatment is preferably performed only within the resin application region. The subbing treatment is preferably conducted such that on the separator substrate, those regions besides the resin application region are masked so as to inhibit the subbing treatment. In another aspect, the subbing treatment performed in those regions besides the resin application region is preferably removed following completion of the subbing treatment.

The resin layer is preferably formed by electrodeposition coating. Furthermore, the resin is preferably a water-soluble resin.

A separator that represents another aspect of the present invention is a separator that forms a partition wall between unit cells of a fuel cell, wherein a resin layer is provided on those portions of the separator substrate excluding the gas passages, for protecting the separator substrate, and OH groups or O atoms that are chemically bonded directly to the atoms on the surface of the separator substrate are also chemically bonded directly to atoms that constitute the resin, between the separator substrate and the resin layer.

According to the present invention, a resin application region on which a resin layer is to be formed is subjected to a subbing treatment that improves the bonding strength between the resin and the separator substrate, and therefore peeling of the resin layer is unlikely, and the corrosion resistance of the separator can be maintained over a long period. As a result, the quality of the fuel cell can be improved.

DETAILED DESCRIPTION

Figure 1:
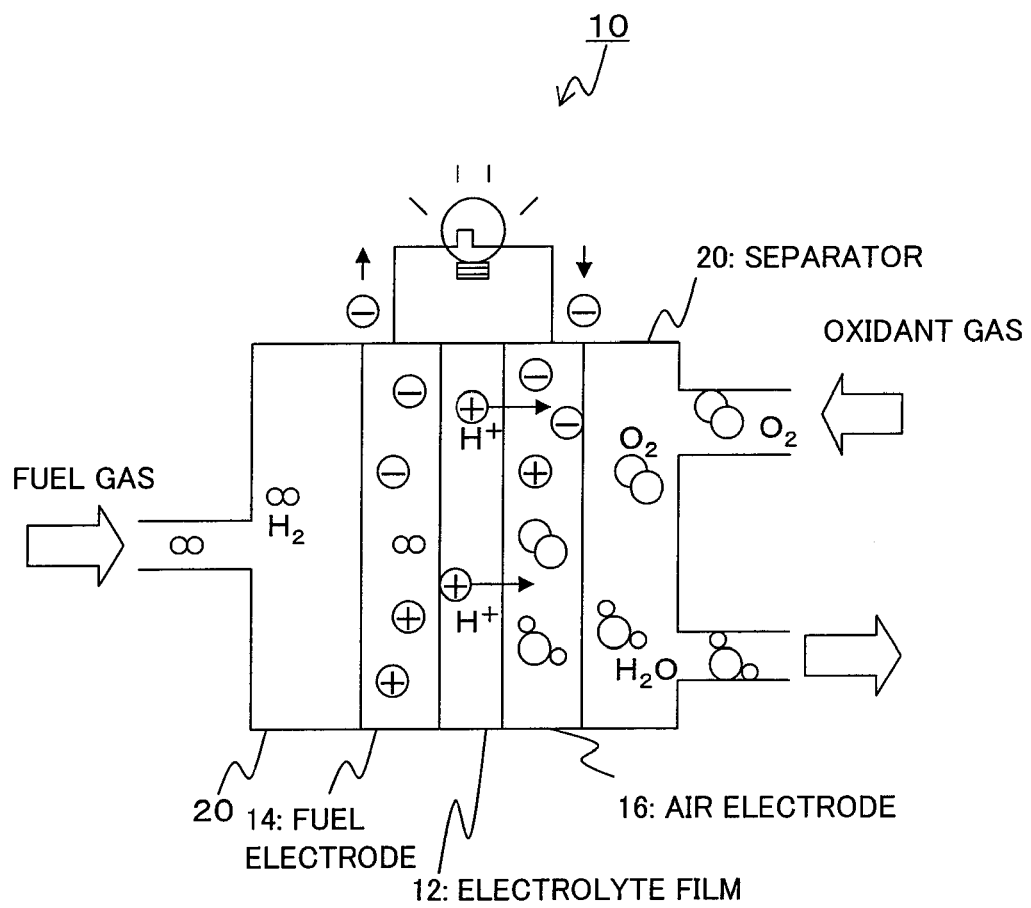
FIG. 1 is a schematic illustration showing the structure of a fuel cell.

Embodiments of the present invention are described below with reference to the drawings. First is a description of the structure of a solid polymer fuel cell, with reference to FIG. 1. In a solid polymer fuel cell 10, an assembly (MEA: Membrane Electrode Assembly) comprising an electrolyte film 12 formed from a solid polymer film sandwiched between two electrodes, namely a fuel electrode 14 and an air electrode 16, is itself sandwiched between two separators 20 to generate a cell that functions as the smallest unit, and a plurality of these cells are then normally stacked together to form a fuel cell stack (FC stack), enabling a high voltage to be obtained.

The mechanism for power generation by the solid polymer fuel cell 10 generally involves the supply of a fuel gas such as a hydrogen-containing gas to the fuel electrode (the anode side electrode) 14, and supply of an oxidant gas such as a gas comprising mainly oxygen ($O_2$) or air to the air electrode (the cathode side electrode) 16. The hydrogen-containing gas is supplied to the fuel electrode 14 via fine channels formed in the surface of the separator 20, and the action of the electrode catalyst causes the hydrogen to dissociate into electrons and hydrogen ions ($H^+$). The electrons flow through an external circuit from the fuel electrode 14 to the air electrode 16, thereby generating an electrical current. Meanwhile, the hydrogen ions ($H^+$) pass through the electrolyte film 12 to the air electrode 16, and bond with oxygen and the electrons that have passed through the external circuit, thereby generating reaction water ($H_2O$). The heat that is generated at the same time as the bonding reaction between hydrogen ($H_2$), oxygen ($O_2$) and the electrons is recovered using cooling water. Furthermore, the water generated at the air electrode 16 on the cathode side of the assembly (hereafter referred to as "reaction water") is discharged from the cathode side.

Figure 2:
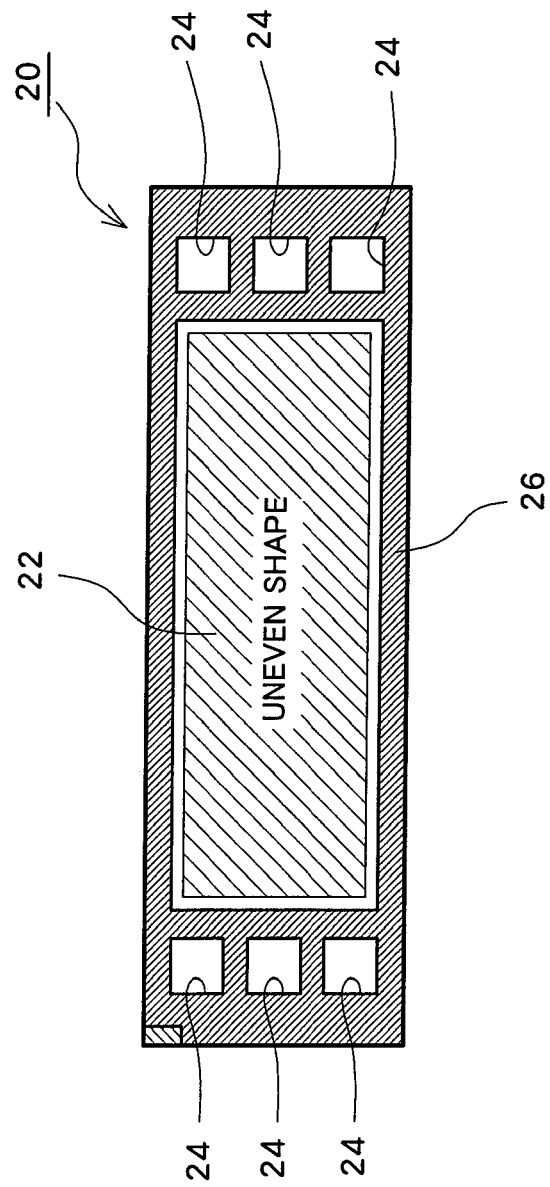
FIG. 2 is a top view of a separator.

FIG. 2 is a top view of the separator 20. The two separators 20 that sandwich the MEA 15 perform a role as partitions for separating the hydrogen gas and the oxygen gas, and also have a function of electrically connecting the stacked cells in a series arrangement. These separators 20 are formed from a metal material such as SUS, and can be formed by press molding or the like.

Gas passages 22 that allow the passage of the hydrogen-containing gas and the oxygen-containing gas or air are formed in the center of each separator 20. Fine uneven channels are formed within the gas passages 22 shown by the hatching in FIG. 2, and the fuel gas is supplied to the assembly via these channels.

Openings that allow the passage of the fuel gas, cooling media, and reaction water and the like are formed as a manifold 24 near the left and right edges of the separator 20. The region in the periphery of this manifold 24 is affected by the fuel gas and water and the like passing through the manifold 24, and is therefore a corrosion-prone environment. Corrosion around the periphery of the manifold 24 not only reduces the life of the fuel cell, but also causes a reduction in the cell efficiency. In other words, corroded substances detaching and adhering to the inner wall surfaces of the manifold 24 can cause partial blocking of the manifold 24, resulting in a deterioration in the flow of the fuel gas and the like. As a result, the formation of a corrosion-resistant resin layer around the periphery of the manifold 24 has already been proposed.

Furthermore, the outer periphery of the separator 20 functions as the site of bonding with an adjacent separator 20, a so-called seal line 26. Each separator 20 is bonded to the adjacent separator 20 via an adhesive that is applied to this seal line 26. However, the bonding strength between the separator 20 and the adhesive is usually weak. Accordingly, coating the seal line 26 with a member such as a resin that exhibits powerful bonding to the adhesive, thereby improving the bonding strength between separators 20, has already been proposed.

Figure 3:
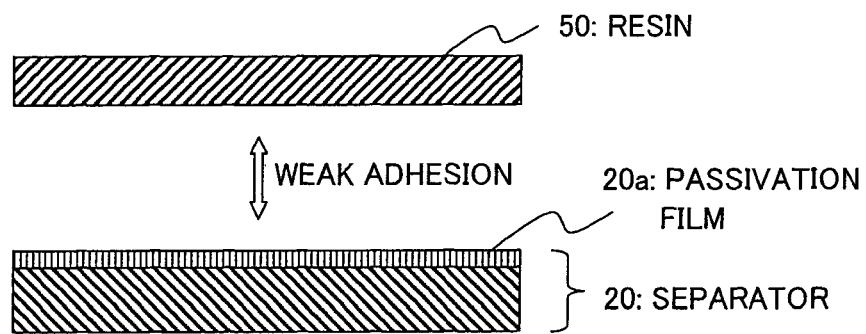
FIG. 3 is a schematic illustration showing the state of bonding between a separator and a resin prior to subbing treatment.

In this manner, the surface of the separator 20 is often coated with a resin in order to improve the corrosion resistance or improve the adhesion with the adjacent separator 20. However, as shown in FIG. 3, a chemically inert passivation film 20a is often formed on the surface of the separator 20. This passivation film 20a is known to exhibit poor affinity with a resin 50. As a result, even if resin coating is performed, if a passivation film 20a exists then the bonding strength between the resin 50 and the separator 20 is weak, and peeling of the resin 50 tends to occur relatively readily under the stress generated during cell stacking, or the stress that is generated accompanying the thermal expansion that occurs during operation of the fuel cell. Peeling of the resin 50 then induces corrosion of the separator 20. Furthermore, resin 50 that has peeled and detached causes a deterioration in the efficiency of the fuel cell. These factors tend to invite a deterioration in the quality of the fuel cell.

Furthermore, in recent years, water-soluble resins have become widely used as a result of their ease of handling, but because the surface of a separator 20 covered with an inert passivation film 20a has poor wettability, it tends to repel water-soluble resins. As a result, uniform spreading of the resin coating material is inhibited, and the thickness of the resin layer may lack uniformity. Furthermore, very fine holes (pinholes) tend to occur in the formed resin layer, meaning a portion of the separator surface that is supposed to be covered by the resin layer may be exposed externally.

In an embodiment of the present invention, in order to prevent these problems and enable a higher quality separator to be obtained, prior to the formation of the resin layer, a subbing treatment is performed within the resin application region where the resin layer is to be formed, thereby depositing a hydroxide or oxide with a high affinity for the resin on the surface of the separator.

In the present embodiment, because a resin layer is formed over the entire surface of the separator 20 excluding the gas passages 22, this region is specified as the resin application region. However, a limited portion may also be specified as the resin application region, with the subbing treatment and resin layer formation then performed only within this region. In such a case, at least the periphery around the manifold 24 that requires a high level of corrosion resistance, or the seal line 26 along which resin layer formation is preferably conducted in order to improve the adhesion is preferably specified as the resin application region. Furthermore, because a resin layer cannot be formed within the region of the gas passages 22 through which the fuel gas and the like flow, this region should not be specified as the resin application region.

Figure 4:
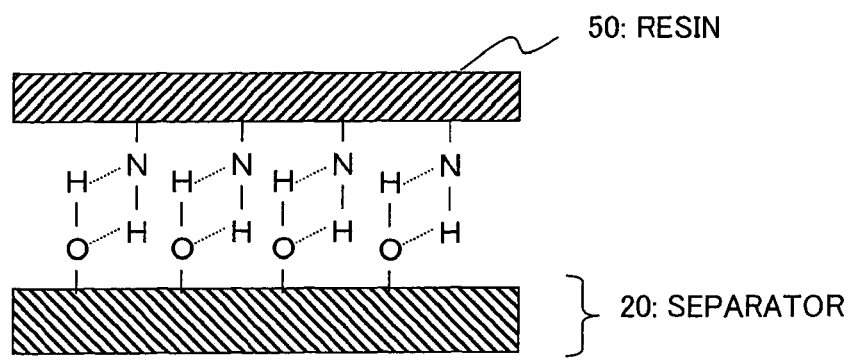
FIG. 4 is a schematic illustration showing the state of bonding between a separator and a resin following completion of a subbing treatment.

FIG. 4 is a schematic illustration showing the state of bonding between a separator 20 that has undergone a subbing treatment and an NH group-containing resin 50. An NH group-containing resin 50 that contains NH groups generally exhibits a high degree of affinity with OH groups. If a subbing treatment is used to deposit a hydroxide onto the surface of the separator 20 in advance, then the OH groups that exist at the surface of the separator 20 and the NH groups contained within the resin 50 undergo a mutual attraction, and bond powerfully together. As a result, even upon exposure to the stress generated during stacking, the resin layer will not peel, and the resin-coated state can be maintained.

Figure 5:
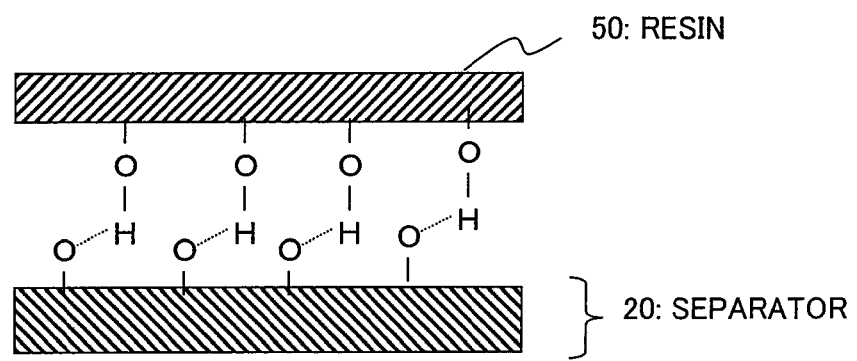
FIG. 5 is a schematic illustration showing another state of bonding between a separator and a resin following completion of a subbing treatment.

This effect also applies in the case where the resin layer 50 is formed using an OH group-containing resin on the surface of a separator 20 onto which an oxide has been deposited via a subbing treatment. FIG. 5 is a schematic illustration showing the state of bonding between a separator 20 that has undergone a subbing treatment and an OH group-containing resin 50. An OH group-containing resin 50 that contains OH groups generally exhibits a high degree of affinity with oxygen atoms. Accordingly, if a subbing treatment is used to deposit an oxide onto the surface of the separator 20 in advance, then the adhesion between the resin 50 and the separator 20 can be improved, meaning peeling of the resin can be prevented even upon exposure to the stress generated during stacking.

Furthermore, in the present embodiment, the OH groups (or O atoms) that are chemically bonded to the atoms on the surface of the separator 20 bond chemically to the atoms that constitute the resin 50. In other words, the separator 20 and the resin 50 can be claimed to be bonded at the atomic level. Accordingly, unlike the conventional technology where a corrosion-resistant member is affixed to the separator surface via an adhesive or the like, in the present embodiment, the gap between the separator 20 and the resin 50 can be reduced to effectively nothing. As a result, penetration of water or the like into the space between the resin 50 and the separator 20 can be reliably prevented, enabling the corrosion resistance of the entire separator 20 to be effectively improved.

Moreover, when a hydroxide or an oxide is deposited on the surface of the separator 20, the wettability (hydrophilicity) of the surface can also be improved. As a result, even when a water-soluble resin is applied to the surface of the separator 20, the resin is not repelled, and a favorable resin layer can be obtained that has a uniform thickness and suffers no problems such as pinholes or the like.

Next is a more detailed description of the subbing treatment performed on the surface of the separator 20. There are no particular restrictions on the subbing treatment performed on the separator 20, provided the treatment is capable of depositing a hydroxide or oxide onto the separator surface, and one suitable example is a plasma treatment. As already known, a plasma treatment involves bringing a plasma-state gas into contact with the member undergoing treatment, thereby inducing a chemical reaction between the gas and the member. According to such a plasma treatment, the region altered by the chemical reaction can be limited to only a thin layer having a submicron thickness from the surface of the member undergoing treatment. In order to perform a subbing treatment on the surface of the separator 20 using this type of plasma treatment, the separator 20 is placed within an atmosphere containing a plasma-state gas. In such a case, a chemical reaction is induced between water ($H_2O$) within the atmosphere and the surface layer of the separator 20. As a result, chemically active OH groups are deposited on the surface of the separator 20 instead of the inert passivation film.

Furthermore, chemical conversion treatment is another example of a possible subbing treatment method. In this method, a chemical reaction is initiated electrically with the separator 20 immersed within a solvent containing O atoms, thereby depositing an oxide on the separator surface. In this case, covalent bonds are formed between the metal atoms at the surface of the separator 20 and the oxygen atoms, and those bonds are very strong. As a result, the bonding strength between the separator 20 and the resin 50 also improves, and peeling of the resin 50 can be prevented even more reliably.

When a subbing treatment such as those described above is performed, the gas passages 22 are first masked, so as to inhibit subbing treatment of the gas passages 22. This masking is to prevent any deterioration in the corrosion resistance that may accompany the subbing treatment. Namely, when a subbing treatment is performed, the passivation film is removed. The periphery around the manifold 24 and the seal line 26 where the resin layer is formed are protected by the resin layer, and therefore removal of the passivation film presents no particular problems. However in the region of the gas passages 22, which is not protected by the resin layer, removal of the passivation film causes a dramatic reduction in the corrosion resistance. Such corrosion invites an increase in the surface resistance and detachment of corroded substances, leading to a deterioration in the efficiency of the fuel cell. Accordingly, in the present embodiment, the gas passages 22 are masked prior to performing the subbing treatment. This masking can be achieved by a technique in which a sealing film that inhibits penetration of the plasma or the solvent is bonded in a removable manner on top of the gas passages 22.

The corrosion resistance of the gas passages may also be maintained not by preventing subbing treatment of the gas passages 22, but rather by removing the subbing treatment performed on the gas passages 22. In other words, the subbing treatment may be performed upon the entire separator 20, without any masking, with a passivation film then being re-formed on the surface of the gas passages 22.

Provided the subbing treatment enables a hydroxide or oxide to be deposited on the surface of the resin application region, a resin layer can then be formed favorably within the resin application region. The resin layer can be formed using any of a variety of conventional techniques, although the following description focuses on resin layer formation by electrodeposition coating. In those cases where the resin layer is formed by electrodeposition, the masked separator that has already undergone subbing treatment is immersed as the cathode within a resin coating material. A direct electrical current is then passed between the separator (the cathode) and an anode (+) positioned inside a membrane chamber within the electrodeposition tank, thereby forming a resin layer on the surface of the separator. At the time of this electrodeposition coating, the surface of the separator is in a state wherein a hydroxide or oxide that exhibits favorable affinity with the resin coating material has already been deposited on the surface (see FIG. 4 and FIG. 5). Accordingly, the resin coating material bonds strongly to the OH groups (or O atoms) on the separator surface. As a result, peeling of the resin can be more reliably prevented, and the corrosion resistance of the separator can be maintained over a long period. Furthermore, because the resin and the separator are bonded together at the atomic level, the gap between the two can be reduced to effectively nothing, enabling a high degree of corrosion resistance to be achieved. Moreover, because the hydrophilicity of the separator is improved as a result of the subbing treatment, a resin layer of uniform thickness can be obtained without the occurrence of problems such as pinholes.

A separator production apparatus used for producing the separator is equipped with a subbing treatment device, namely an aforementioned plasma treatment device or a chemical conversion treatment device or the like, that is capable of performing a subbing treatment on the resin application region of a separator substrate that has been molded to a predetermined shape. The resin layer may either be formed immediately following the subbing treatment, or formed immediately prior to sandwiching the MEA or the like between the separators.

As described above, according to an embodiment of the present invention, a high-quality separator can be obtained that is capable of maintaining a high degree of corrosion resistance over a long period.

The invention claimed is:

1. A process for producing a separator that forms a partition wall between unit cells of a fuel cell, the process consisting of:
    performing a subbing treatment only within a resin application region on a separator substrate, the resin application region being a region in which a resin layer is to be provided, to deposit a hydroxide or oxide having an affinity for atoms constituting the resin to be deposited, prior to provision of the resin layer; and
    forming the resin layer within the resin application region that has been subjected to the subbing treatment,
    wherein the separator substrate has gas passages formed thereon, and
    wherein the resin application region excludes the gas passages.

2. The process for producing a separator according to claim 1, wherein
    the resin application region is in a vicinity of an opening through which a fluid can pass.

3. The process for producing a separator according to claim 2, wherein
    the resin application region is a seal line that represents a region of bonding with an adjacent separator.

4. The process for producing a separator according to claim 3, wherein
    in a case where the resin layer comprises an NH group-containing resin,
    the subbing treatment is a treatment in which a hydroxide is deposited on a surface of the separator substrate.

5. The process for producing a separator according to claim 4, wherein
    the subbing treatment is a treatment in which OH groups are covalently bonded to metal atoms on the surface of the separator substrate.

6. The process for producing a separator according to claim 3, wherein
    in a case where the resin layer comprises an OH group-containing resin,
    the subbing treatment is a treatment in which oxygen atoms are covalently bonded to metal atoms on the surface of the separator substrate.

7. The process for producing a separator according to claim 3, wherein
    following the subbing treatment, the subbing treatment performed in regions besides the resin application region is removed.

8. The process for producing a separator according to claim 3, wherein
    the resin layer is formed by electrodeposition coating.

9. The process for producing a separator according to claim 3, wherein
    the resin is a water-soluble resin.

10. The process for producing a separator according to claim 1, wherein
    the subbing treatment is performed such that, on the separator substrate, regions besides the resin application region are masked so as to inhibit the subbing treatment.

* * * * *